US009499079B2

(12) United States Patent
Meister et al.

(10) Patent No.: US 9,499,079 B2
(45) Date of Patent: Nov. 22, 2016

(54) LINEARLY DEPLOYABLE AIRCRAFT SEAT LEGREST

(71) Applicant: B/E Aerospace, Inc., Wellington, FL (US)

(72) Inventors: Peter C. Meister, Miami, FL (US); Aravinda Mahabaleshwara, Bangalore (IN)

(73) Assignee: B/E Aerospace, Inc., Wellington, FL (US)

( * ) Notice: Subject to any disclaimer, the term of this patent is extended or adjusted under 35 U.S.C. 154(b) by 27 days.

(21) Appl. No.: 14/517,189

(22) Filed: Oct. 17, 2014

(65) Prior Publication Data

US 2015/0108817 A1 Apr. 23, 2015

Related U.S. Application Data

(60) Provisional application No. 61/893,618, filed on Oct. 21, 2013.

(51) Int. Cl.
*A47C 7/50* (2006.01)
*B60N 2/44* (2006.01)
*B60N 2/62* (2006.01)
*B64D 11/06* (2006.01)

(52) U.S. Cl.
CPC .............. *B60N 2/62* (2013.01); *A47C 7/506* (2013.01); *B60N 2/4495* (2013.01); *B64D 11/0643* (2014.12); *B64D 11/0648* (2014.12)

(58) Field of Classification Search
CPC .................................. A47C 7/506; B60N 2/4495
USPC ........................................ 297/423.26, 85 M
See application file for complete search history.

(56) References Cited

U.S. PATENT DOCUMENTS

| | | | | | |
|---|---|---|---|---|---|
| 3,794,381 | A | * | 2/1974 | Caldemeyer | A47C 7/506 297/423.22 |
| 4,509,795 | A | * | 4/1985 | Brennan | A47C 7/506 297/423.32 |
| 5,352,020 | A | * | 10/1994 | Wade | B60N 2/4495 297/423.19 |
| 5,507,562 | A | * | 4/1996 | Wieland | A47C 7/506 297/423.2 |
| 5,560,681 | A | * | 10/1996 | Dixon | B60N 2/4495 297/284.11 |
| 5,673,967 | A | * | 10/1997 | Wempe | A61G 5/006 297/423.26 |
| 6,145,931 | A | * | 11/2000 | Subotic | A47C 16/025 297/188.11 |
| 6,382,727 | B1 | * | 5/2002 | Pickard | A47C 1/0265 297/30 |
| 8,123,288 | B2 | * | 2/2012 | Murphy | A47C 1/0355 297/85 M |

(Continued)

FOREIGN PATENT DOCUMENTS

DE    10 2010 030553 A1    12/2011

OTHER PUBLICATIONS

International Search Report and Written Opinion of corresponding International Application No. PCT/US15/10640; mail date Apr. 8, 2015; 9 pages.

*Primary Examiner* — Timothy J Brindley
(74) *Attorney, Agent, or Firm* — Shumaker, Loop & Kendrick, LLP

(57) ABSTRACT

A legrest assembly adapted for use with an aircraft passenger seat including a pair of spaced parallel support members adapted to extend forward from the front of the seat, a legrest pivotally supported on ends of the support members configured to pivot from near vertical when stowed to near horizontal when deployed, a brake mechanism for stopping forward deployment of the legrest, and an actuator for driving forward deployment of the legrest.

19 Claims, 5 Drawing Sheets

(56) References Cited

U.S. PATENT DOCUMENTS

| | | | | |
|---|---|---|---|---|
| 8,366,188 B2* | 2/2013 | Adams | A47C 1/0355 | 297/423.3 |
| 8,746,802 B1* | 6/2014 | Delmestri | A47C 7/506 | 297/423.19 |
| 8,926,009 B1* | 1/2015 | LaPointe | A47C 7/506 | 297/423.28 |
| 2001/0022461 A1* | 9/2001 | Marcantoni | A47C 7/506 | 297/423.36 |
| 2002/0043864 A1* | 4/2002 | Sander | A47C 7/506 | 297/423.19 |
| 2002/0063449 A1* | 5/2002 | Plant | B60N 2/34 | 297/68 |
| 2002/0113477 A1* | 8/2002 | Uchiyama | A47C 7/506 | 297/330 |
| 2003/0075966 A1* | 4/2003 | Behnert | B60N 2/4495 | 297/423.26 |
| 2004/0189074 A1* | 9/2004 | Seki | B60N 3/063 | 297/423.1 |
| 2005/0012377 A1* | 1/2005 | Ito | B60N 2/0232 | 297/423.26 |
| 2005/0189808 A1* | 9/2005 | Lin | A47C 7/52 | 297/423.21 |
| 2006/0087158 A1* | 4/2006 | Kramer | A47C 1/022 | 297/29 |
| 2010/0052395 A1* | 3/2010 | Anglese | A47C 7/506 | 297/423.3 |
| 2010/0194169 A1* | 8/2010 | Shinozuka | B60N 2/4495 | 297/423.26 |
| 2010/0244534 A1 | 9/2010 | Driessen et al. | | |
| 2013/0062914 A1* | 3/2013 | Marshall | A47C 7/506 | 297/69 |
| 2013/0099543 A1* | 4/2013 | An | A47C 7/506 | 297/354.1 |
| 2013/0169018 A1* | 7/2013 | Fischer | A47C 7/506 | 297/423.19 |
| 2013/0249190 A1* | 9/2013 | Engman | A61G 5/12 | 280/291 |
| 2014/0292052 A1* | 10/2014 | Parker | A47C 7/38 | 297/342 |
| 2015/0108817 A1* | 4/2015 | Meister | B64D 11/0648 | 297/423.26 |
| 2015/0196123 A1* | 7/2015 | Buehrer | A47C 1/0347 | 297/325 |
| 2015/0284092 A1* | 10/2015 | Wilkey | B60N 2/442 | 297/423.29 |
| 2015/0305507 A1* | 10/2015 | Besler | A47C 7/506 | 297/423.28 |

* cited by examiner

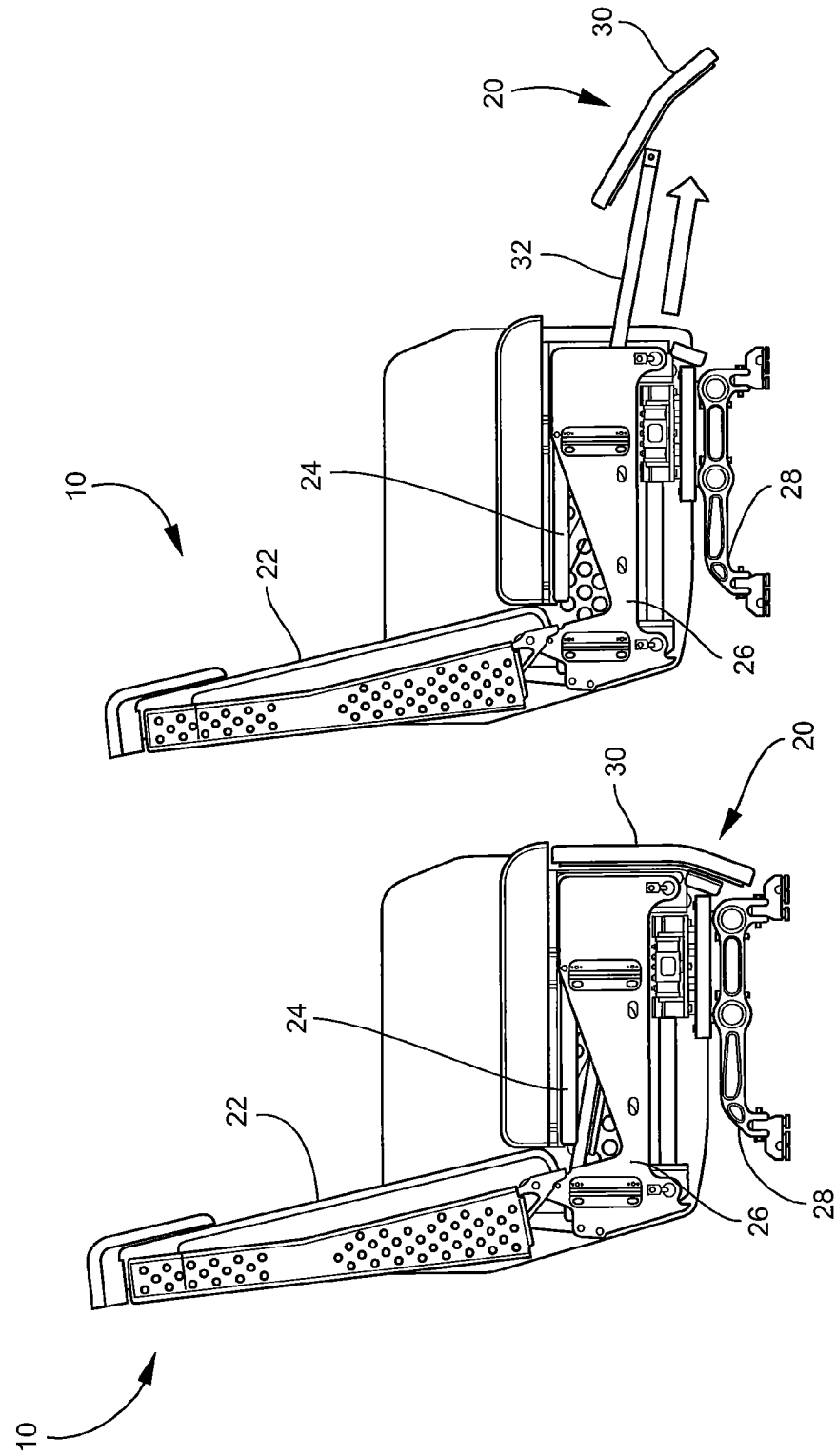

LINEARLY DEPLOYABLE AIRCRAFT SEAT LEGREST

CROSS-REFERENCE TO RELATED APPLICATION

This application claims priority from U.S. Patent Application No. 61/893,618 filed Oct. 21, 2013, the entirety of which is incorporated by reference herein.

TECHNICAL FIELD AND BACKGROUND OF THE INVENTION

The present invention relates generally to a deployable passenger seat legrest, and more particularly, to a legrest configured to deploy linearly from a seat frame or seat pan assembly to provide a long extension, and support farther from the seat frame or seat pan assembly than possible with conventional pivoting or scissor mechanisms.

Premium class aircraft passenger seats commonly include a deployable legrest for supporting a seated passenger's feet and lower legs in an elevated position to enhance comfort during a flight. Conventional legrest assemblies typically deploy by way of pivoting movement in which the legrest pivots from a lowered, vertical position against the front of the seat to a raised, near horizontal or horizontal position spaced slightly forward of the front of the seat. Other conventional legrests may be supported on scissor links configured for forward movement when extended to position the legrest at a distance from the front of the seat.

With regard to pivoting legrests, the maximum achievable distance of the legrest from the front of the seat is limited by the length of the pivoting support structure, which in-turn is limited by the seat height and space constraints beneath the seat pan. Legrest extensions are therefore needed to accommodate tall passengers, but still may not be able to achieve long distances. Further, legrest extensions add complexity and weight to the seat, which is particularly undesirable in aircraft applications where weight is critical. Still further, pivoting mechanisms require large closing forces throughout the range of movement, and therefore require closing mechanisms that add weight, cost and complexity to the seat.

With regard to scissor driven legrests, such mechanisms require a large number of links to provide adequate extension of the legrest forward of the seat. Multiple links add weight and complexity, and are difficult to package within the space constraints beneath the seat pan. Further, scissor mechanisms tend to be unstable in the direction transverse to the extension direction, which can lead to undesirable side-to-side motion and passenger discomfort. Still further, scissor mechanisms require complex latches to stop the extension short of full extension, making it difficult and/or complex to provide a stepless/selectively adjustable legrest.

Therefore, what is needed is a deployable legrest that is lightweight, easy to deploy and easy to stow, and capable of achieving a long extension forward of the front of the seat.

BRIEF SUMMARY OF THE INVENTION

It is therefore an object of the present invention to provide a deployable legrest adapted for use with a passenger seat, such as an aircraft passenger seat.

It is another object of the invention to provide a linearly deployable legrest adapted to provide a long extension and support forward of the front of the seat.

It is another object of the invention to provide a linearly deployable legrest in which the closing forces required to stow the legrest are applied in the direction of the legrest support mechanism, facilitating easy closing.

It is another object of the invention to provide a legrest supported on a pair of parallel support members adapted to extend forward from a front of the seat, wherein the legrest is configured to pivot relative to the support members such that the legrest can be stored substantially vertically against the front of the seat when not in use and deploys to near horizontal or horizontal when in use.

It is another object of the invention to provide a linearly deployable legrest adapted to be supported by one or more of a seat frame and a seat pan assembly.

It is another object of the invention to provide a legrest that deploys linearly and pivots to near horizontal or horizontal such that the reactant load direction on the legrest is perpendicular to the deployment direction.

It is another object of the invention to provide a linearly deployable legrest adapted to be utilized with a seat configuration in which the seat pan is free to move independent of the seat frame and/or independent of seatback motion.

To achieve the foregoing and other objects and advantages, provided herein is a deployable legrest adapted for use with a passenger seat and including a pair of spaced parallel support members adapted to deploy forward from a front of a passenger seat, a legrest pivotally supported on ends of the pair of spaced parallel support members, the legrest configured to pivot from near vertical when stowed to near horizontal when deployed, a brake mechanism for stopping forward deployment of the legrest, and an actuator arranged to drive forward deployment of the legrest.

In another aspect, the pair of spaced parallel support members may be adapted to be supported by a seat frame or a seat pan assembly of the passenger seat.

In another aspect, the pair of spaced parallel support members may include cylindrical tubes arranged to slide along linear-motion bearings.

In another aspect, the pair of spaced parallel support members may include multi-section compound slides, wherein a first section of each multi-section compound slide may be attached to a seat frame or seat pan assembly of the passenger seat and a second section of each multi-section compound slide may be pivotally attached to the legrest.

In another aspect, the actuator may be one of a linear actuator, a gas spring, and a cable and pulley mechanism.

In another aspect, the actuator may be a gas spring arranged between the pair of spaced parallel support members, wherein the actuator is attached at one end to a seat frame or seat pan assembly of the passenger seat and at an opposing end to the legrest, and wherein the actuator is loaded when the legrest is stowed and releases to deploy the legrest.

In another aspect, the legrest assembly may include a legrest stabilizer arranged between the pair of spaced parallel support members.

In another embodiment, provided herein is an aircraft passenger seat including a seat frame supporting a seatback and a seat pan, and a legrest assembly supported by the seat frame or the seat pan and including a pair of spaced parallel support members adapted to deploy forward from a front of the passenger seat, a legrest pivotally supported on ends of the pair of spaced parallel support members, the legrest configured to pivot from near vertical when stowed to near horizontal when deployed, a brake mechanism for stopping forward deployment of the pair of spaced parallel support members, and an actuator for driving forward deployment of the pair of spaced parallel support members.

In another aspect, the pair of spaced parallel support members may be cylindrical tubes arranged to slide along linear-motion bearings.

In another aspect, the pair of spaced parallel support members may be multi-section compound slides, wherein a first section of each multi-section compound slide is attached to a seat frame or seat pan assembly of the passenger seat and a second section of each multi-section compound slide is pivotally attached to the legrest.

In another aspect, the actuator may be one of a linear actuator, a gas spring, and a cable and pulley mechanism.

In another aspect, the actuator may be a gas spring arranged between the pair of spaced parallel support members, wherein the actuator is attached at one end to a seat frame or seat pan assembly of the passenger seat and at an opposing end to the legrest, and wherein the actuator is loaded when the legrest is stowed and releases to deploy the legrest.

In another aspect, the legrest assembly may include a legrest stabilizer arranged between the pair of spaced parallel support members.

Embodiments of the invention can include one or more or any combination of the above features, aspects and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are understood when the following detailed description of the invention is read with reference to the accompanying drawings, in which:

FIG. 1 is a side view of an exemplary aircraft passenger seat including a linearly deploying legrest according to an embodiment of the invention, showing the legrest in a stowed position;

FIG. 2 is a side view of the seat of FIG. 1 showing the legrest in a deployed position;

DETAILED DESCRIPTION OF THE INVENTION

Figure 3:
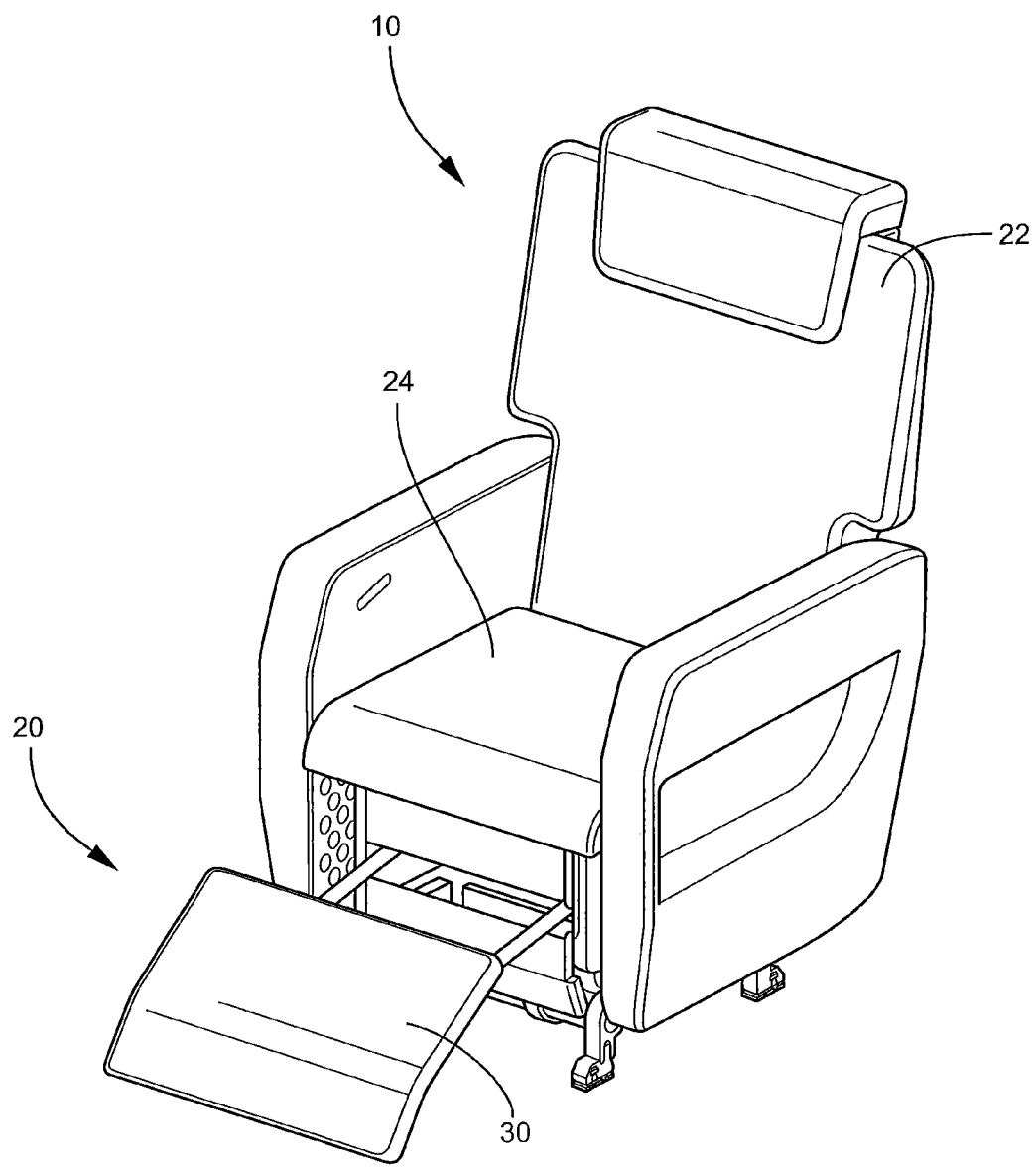
FIG. 3 is an isometric view of an exemplary passenger seat showing the linearly deployable legrest in a deployed position.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, a linearly deployable legrest assembly configured for use with a variety of aircraft passenger seats is shown generally at reference numeral 20. An exemplary aircraft passenger seat suitable for use with the legrest assembly 20 is shown generally at reference numeral 10. The aircraft passenger seat 10, also referred to herein as the "seat," may be a recline-capable seat including a reclining seatback 22 and independently pivoting seat pan 24. The exemplary seat pan 22 shown is arranged to pivot independent of seat frame movement and independent of seatback movement.

The seat 10 generally includes the seatback 22, seat pan 24, seat frame 26, which may be fixed or moveable, legs 28, and the legrest assembly 20. The seat pan 24 is support on the seat frame 26, and generally includes left- and right-side seat rails that pivotally support the seat pan about a pivot axis. The seat rails may be shaped to define a pivoting range of motion of the seat pan 24. For example, the forward end of the top of the rails may be substantially horizontal such that the forward end of the seat pan is prevented from pivoting downward past horizontal, while the rear end of the rails may be at an angle to horizontal such that the rear end of the seat pan is prevented from pivoting downward beyond the rails. The shape of the rails may be customized to control the range of motion of the seat pan 24.

FIG. 1 shows the seat 10 in an upright sitting position suitable for taxi, take-off and landing, with the legrest assembly 20 in a stowed position with the legrest 30 flush against the front of the seat and in a near vertical orientation. In the stowed position of the legrest assembly 20, the support members that support the legrest 30, discussed in detail below, are retracted into the seat and concealed therein. FIG. 2 shows the seat 10 in a partially reclined sitting position in which the seatback 22 is partially reclined and the legrest assembly 20 is deployed. In the deployed position of the legrest assembly 20, the legrest 30 is driven forward of the front of the seat as a result of the support members 32 being driven forward, thereby exposing a portion the support members. In the deployed position of the legrest assembly 20, the legrest 30 pivots relative to the support members 32 toward horizontal, near horizontal, or to horizontal. Thus, as the legrest assembly 20 deploys forward of the seat, the legrest pivots to achieve a more horizontal orientation than when stowed.

Referring to FIGS. 2 and 3, the legrest assembly 20 deploys to a distance from the front of the seat 10, such as seat pan 24, providing support for the passenger's lower legs and feet in an elevated position at a distance from the seat pan. As shown, the legrest 30 may define two supporting surfaces at an angle to each other to comfortably provide support beneath the ankles by conforming to the passenger's anatomy. The legrest 30, as well as other seat surfaces, may covered with foam padding and upholstery for comfort and aesthetics. The legrest assembly 20 may deploy independent of seat recline or cooperatively therewith. The legrest 30 may deploy from the seat frame 26, or may deploy from the seat pan 24, thereby linking the deployment angle of the legrest assembly with that of the seat pan.

Figure 4:
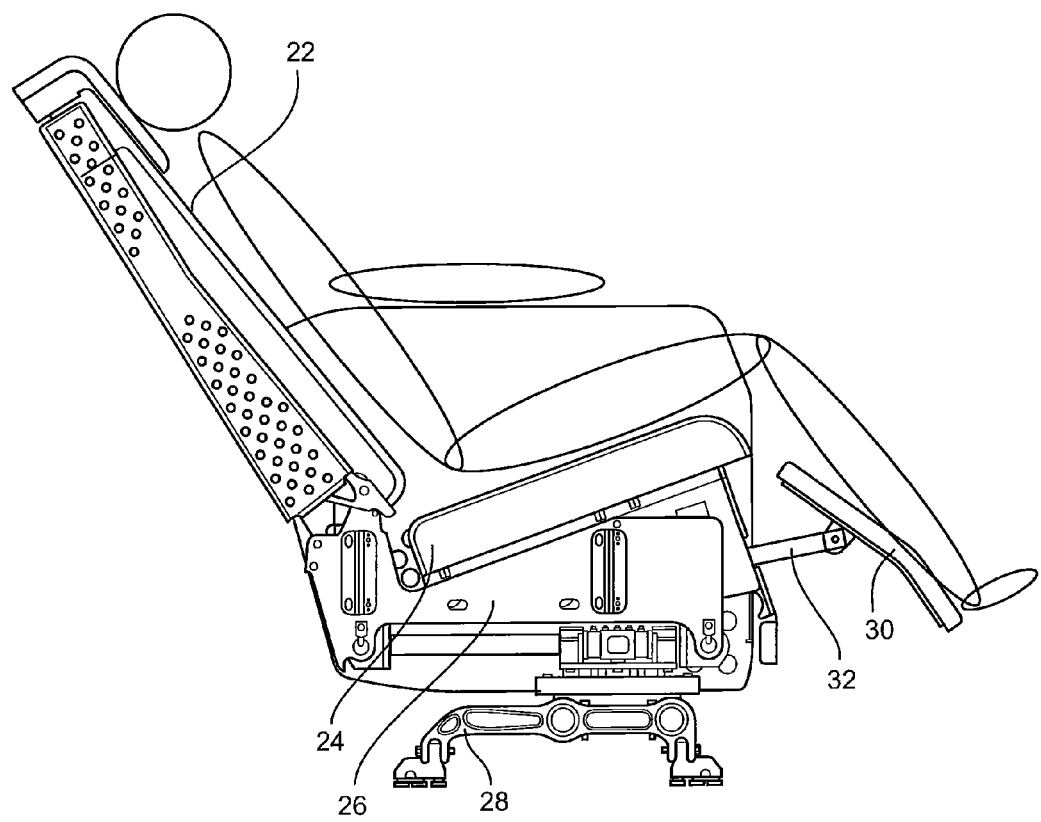
FIG. 4 is a side view of the seat of FIG. 1 showing the seat occupied, the seatback reclined, and the linearly deployable legrest partially deployed.

Referring to FIG. 4, the seat 10 is shown in a reclined sitting position in which the seatback 22 is reclined and the seat pan 24 is inclined relative to the upright take-off sitting position. Comparing FIGS. 2 and 4, it can be seen that the angle of deployment of the legrest assembly is dependent on the seat pan angle. Specifically, when the seat pan 24 is substantially horizontal as shown in FIG. 2, the legrest assembly 20 deploys at an angle below horizontal, and when the seat pan 24 is inclined as shown in FIG. 4, the legrest assembly 20 deploys at an angle above horizontal. Linking the angle of legrest assembly deployment with the angle of the seat pan 24 positions the extended legrest 30 at a comfortable position for the seat occupant. In an alternative embodiment, the legrest assembly 20 may be supported by the stationary seat frame 26, and thus may deploy independent of seat pan movement.

Figure 5:
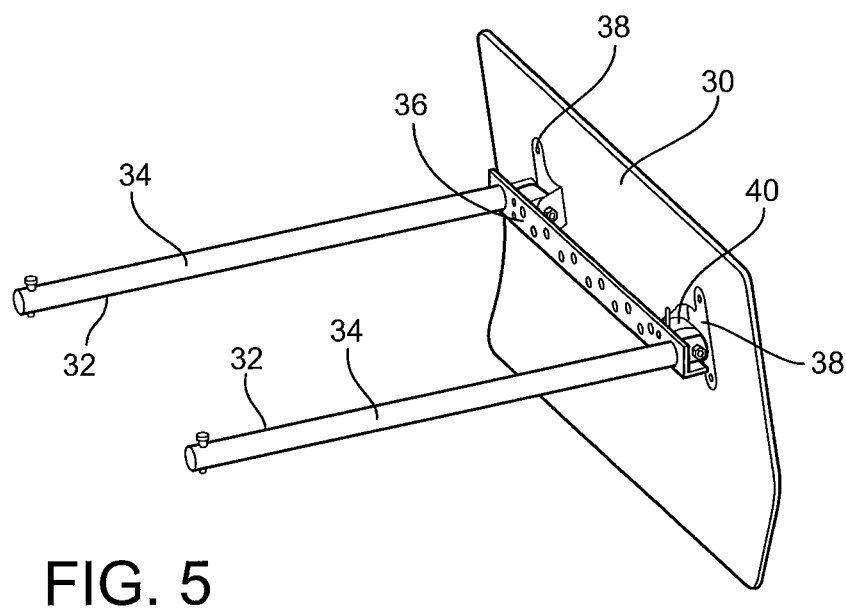
FIG. 5 is an isometric view of an embodiment of a linearly deployable legrest including a pair of parallel support tubes.

Referring to FIG. 5, in a first embodiment of the legrest assembly 20 the legrest 30 is pivotally attached to the ends of the spaced parallel support members 32, wherein the spaced parallel support members are elongate, cylindrical tubes 34 having a fixed length. The legrest 30 is cooperatively supported by the cylindrical tubes 34. The cylindrical tubes 34 are received through a stabilizer 36 that resists twisting of the legrest 30 and support members 32. One end of each of the cylindrical tubes 34 is attached to pivot brackets 38 that attach to the backside of the legrest 30 using fasteners. The pivot brackets 38 allow the legrest 30 to pivot about the end of the cylindrical tubes 34 between near vertical and near horizontal. A torsion spring 40 may be utilized at the connection of the legrest 30 and pivot brackets 38 to bias the legrest toward a predetermined position, for example, toward vertical. The torsion spring 40 stores mechanical energy as the legrest 30 is urged toward horizontal, thereby returning the legrest 30 to near vertical for stowing when the passenger's legs/feet are removed from the legrest. The opposing end of each of the cylindrical tubes are unattached, allowing linear movement as described with regard to FIG. 7 below.

Figure 6:
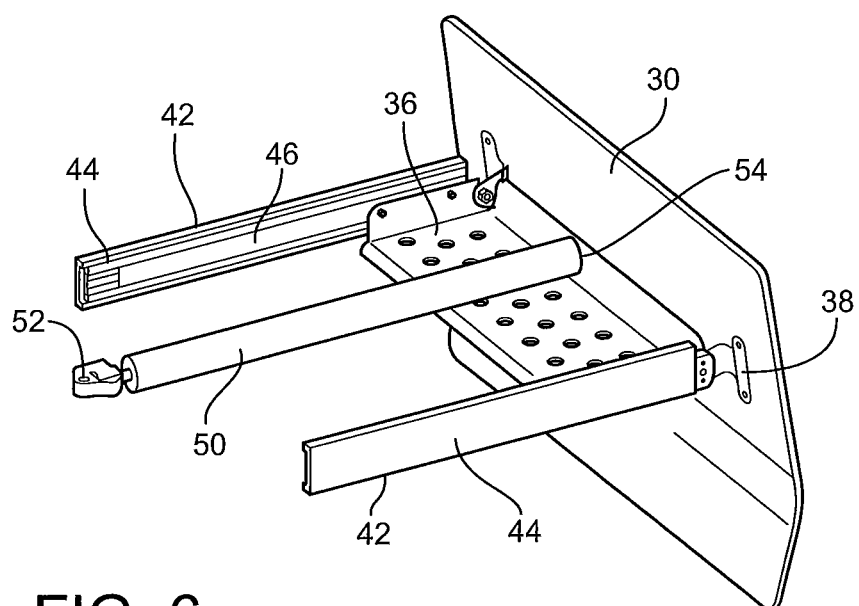
FIG. 6 is an isometric view of an embodiment of a linearly deployable legrest including a pair of parallel telescoping slides.

Referring to FIG. 6, in a second embodiment of the legrest assembly 20 the support members 32 are multi-section compound slides 42, wherein a first section 44 of each multi-section compound slide is adapted to attach to a seat frame or seat pan assembly of the passenger seat 10 and a second section 46 of each multi-section compound slide is pivotally attached to the legrest 30. The multi-section compounds slides 42 may be 2-section, 3-section or n-section slides depending of the desired extension distance forward of the seat 10. In the case of a 2-section compound slide, the first section 44 is fixed and the second section 46 slides relative to the first section. In the case of a 3-section compound slide, an intermediate section may float between the fixed and moving sections, thereby providing a greater extension length that a 2-section compound slide.

An actuator 50, such as the gas spring shown, is arranged between the spaced support members 32. A first end 52 of the actuator 50 attaches to the seat frame 26 or seat pan 24, while the opposing end 54 of the actuator attaches to one of the stabilizer 36 or backside of the legrest 30. In operation, the actuator 50 is a linear actuator that is loaded (i.e., stores energy) when the legrest is stowed and releases to deploy the legrest 30 forward of the seat. Other actuators may be utilized to deploy the legrest 30 such as a linear actuator or a cable and pulley mechanism, among others. Legrest deployment and stowing may also be electrically powered and controlled.

Figure 7:
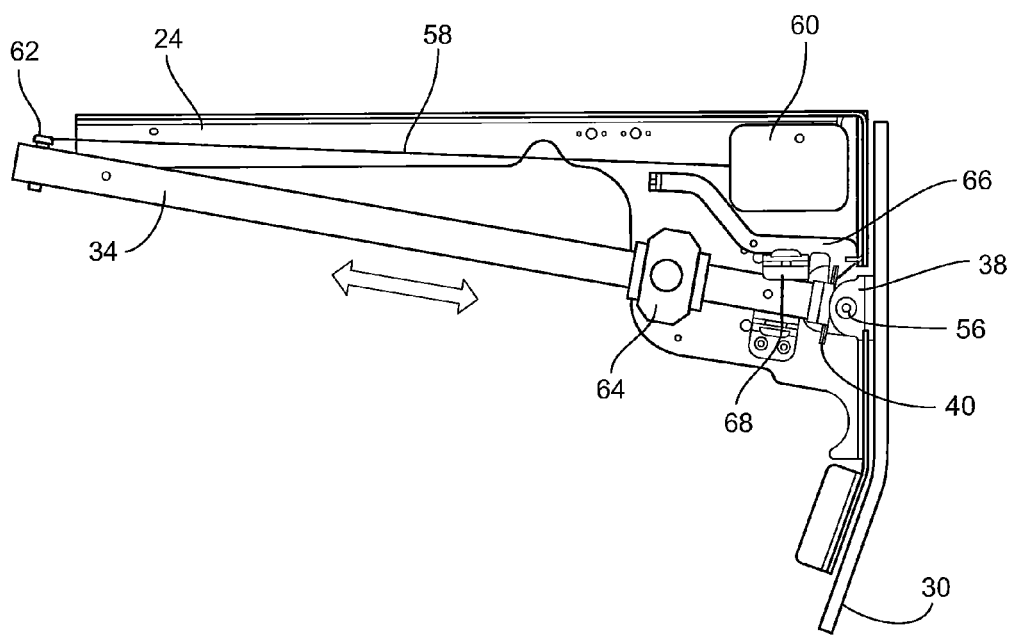
FIG. 7 is a side view of the support tube configuration of FIG. 5 illustrating a one embodiment of a braking mechanism.

Referring to FIG. 7, a cord and reel arrangement associated with the tube configuration of the legrest assembly is shown. The cylindrical tubes 34 attach at one end to the pivot bracket 38 by way of a pivot bolt 56, and attach at their opposing end to a cord 58 that gathers around a cord reel 60. The cord 58 is attached to the cylindrical tube 34 using a fastener 62. The cylindrical tubes 34 are arranged to slide within and relative to fixed linear-motion bearings 64. A hook 66 carrying a rubber stopper 68 works as a brake on the cylindrical tube to hold the tube in place at a desired extension position. The linear-motion bearing 64, cord reel 60 and hook 66 may be attached to and supported by the forward end of the inside of the seat pan 24, for example, one side rail of the seat pan. The cylindrical tubes 34 deploy through the front face of the seat pan 24. The legrest 30 is released by actuating the hook 66 through a seat control. The legrest 30 is easy to stow by pushing directly in the direction of the slides, tubes, or rails.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A legrest assembly adapted for use with a passenger seat, comprising:
   a pair of spaced parallel support members adapted to translate forward and aft relative to a pivoting seat pan;
   a legrest pivotally attached on a backside thereof to forward ends of the pair of spaced parallel support members, the legrest configured to pivot relative to the pair of spaced parallel support members from near vertical when stowed to near horizontal when deployed;
   a brake mechanism including a hook carrying a stopper arranged to brake one of the spaced parallel support members to hold the one of the spaced parallel support members at a desired extension position; and
   an actuator arranged to drive forward deployment of the legrest.

2. The legrest assembly of claim 1, wherein the pair of spaced parallel support members are adapted to translate forward through a front face of the pivoting seat pan.

3. The legrest assembly of claim 1, wherein the pair of spaced parallel support members comprise cylindrical tubes arranged to slide along linear-motion bearings.

4. The legrest assembly of claim 1, wherein the pair of spaced parallel support members comprise multi-section compound slides, and wherein a first section of each multi-section compound slide is attached to a seat frame or seat pan assembly of the passenger seat and a second section of each multi-section compound slide is pivotally attached to the backside of the legrest at positions inward of lateral sides of the legrest.

5. The legrest assembly of claim 1, wherein the actuator is one of a linear actuator, a gas spring, and a cable and pulley mechanism.

6. The legrest assembly of claim 1, wherein the actuator is a gas spring arranged between the pair of spaced parallel support members, wherein the actuator is attached at one end to a seat frame or seat pan assembly of the passenger seat and at an opposing end to the backside of the legrest, and wherein the actuator is loaded when the legrest is stowed and releases to deploy the legrest.

7. The legrest assembly of claim 1, further comprising a legrest stabilizer arranged between the pair of spaced parallel support members and positioned near the backside of the legrest.

8. An aircraft passenger seat, comprising:
a seat frame supporting a seatback and a pivoting seat pan; and
a legrest assembly supported by the seat pan, the legrest assembly comprising:
a pair of spaced parallel support members adapted to translate forward and aft relative to the pivoting seat pan;
a legrest pivotally attached on a backside thereof to forward ends of the pair of spaced parallel support members, the legrest configured to pivot from near vertical when stowed to near horizontal when deployed;
a brake mechanism including a hook carrying a stopper arranged to brake one of the spaced parallel support members to hold the one of the spaced parallel support members at a desired extension position; and
an actuator for driving forward deployment of the pair of spaced parallel support members.

9. The aircraft passenger seat of claim 8, wherein the pair of spaced parallel support members comprise cylindrical tubes arranged to slide along linear-motion bearings.

10. The aircraft passenger seat of claim 8, wherein the pair of spaced parallel support members comprise multi-section compound slides, and wherein a first section of each multi-section compound slide is attached to a seat frame or seat pan assembly of the passenger seat and a second section of each multi-section compound slide is pivotally attached to the backside of the legrest.

11. The aircraft passenger seat of claim 8, wherein the actuator is one of a linear actuator, a gas spring, and a cable and pulley mechanism.

12. The aircraft passenger seat of claim 8, wherein the actuator is a gas spring arranged between the pair of spaced parallel support members, wherein the actuator is attached at one end to a seat frame or seat pan assembly of the passenger seat and at an opposing end to the backside of the legrest, and wherein the actuator is loaded when the legrest is stowed and releases to deploy the legrest.

13. The aircraft passenger seat of claim 8, further comprising a legrest stabilizer arranged between the pair of spaced parallel support members and positioned near the backside of the legrest.

14. A legrest assembly deployable through a forward face of a pivoting seat pan of an aircraft seat, comprising:
a pair of spaced parallel support members adapted to translate forward and aft relative to the pivoting seat pan;
a legrest pivotally attached on a backside thereof to forward ends of the pair of spaced parallel support members, the legrest configured to pivot from near vertical when stowed to near horizontal when deployed and in use;
an actuator arranged to drive forward deployment of the legrest, wherein the actuator is loaded when the legrest is stowed and releases to deploy the legrest; and
a brake mechanism including a hook carrying a stopper arranged to brake one of the spaced parallel support members to hold the one of the spaced parallel support members at a desired extension position.

15. The legrest assembly of claim 14, wherein the pair of spaced parallel support members comprise cylindrical tubes arranged to slide along linear-motion bearings.

16. The legrest assembly of claim 14, wherein the pair of spaced parallel support members comprise multi-section compound slides, wherein a first section of each multi-section compound slide is attached to the seat pan and a second section of each multi-section compound slide is pivotally attached to the backside of the legrest.

17. The legrest assembly of claim 14, wherein the actuator is one of a linear actuator, a gas spring, and a cable and pulley mechanism.

18. The legrest assembly of claim 14, wherein the actuator is a gas spring arranged between the pair of spaced parallel support members, wherein the actuator is attached at one end to the seat pan and at an opposing end to the legrest.

19. The legrest assembly of claim 14, further comprising a legrest stabilizer arranged between the pair of spaced parallel support members and positioned near the backside of the legrest.

* * * * *